Patented Aug. 26, 1941

2,253,517

UNITED STATES PATENT OFFICE 2,253,517

PROTEIN COMPOSITION

Albert J. Heberer, Maywood, Ill., assignor to The Glidden Company, Cleveland, Ohio, a corporation of Ohio No Drawing. Application July 25, 1938, Serial No. 221,098

10 Claims. (Cl. 134—12)

The present invention relates to soya bean protein compositions and more particularly relates to pigmented compositions such as water paints, coating compositions, distempers, etc., employing soya bean protein.

The use of soya bean protein for water paints and other coating compositions has been proposed heretofore. One of the difficulties, however, has been that there was no satisfactory plasticizer for soya bean protein, so that where flexibility was desired, water paints employing soya bean protein were unsuitable. Another drawback has been that with soya bean protein which is not readily dissolved at a low alkalinity, such as soya bean flour, such a highly alkaline solution is necessary to get sufficient protein in solution and at a working viscosity, as to be harmful to many surfaces on which the paint might otherwise be used.

It is an object of the present invention to provide a plasticizer for soya bean protein.

It is a further object to provide plasticized pigmented soya bean protein composition.

Another object of the invention is to provide a soya bean protein composition of low alkalinity and viscosity having a relatively high content of soya bean protein.

Applicant has discovered that the addition of oil fatty acids to a soya bean protein paint results in an excellent plasticization of the protein. Of the oil fatty acids, it has been found that soya oil fatty acids have better plasticizing action than the usual casein plasticizers and excel other vegetable oil fatty acids such as linseed, China-wood oil, etc. The addition of these acids also lowered the pH value considerably, without any substantial increase in viscosity. Another advantage of the lowered pH value is that at the high pH values the protein solution is more colored, and upon the addition of the acids the color is greatly improved. This is particularly noticeable when the protein used is soya bean flour. In order to properly disperse soya bean flour, high alkalinity is necessary, and a dark yellow-green color is developed which, upon the addition of the soya oil fatty acids, is considerably removed. These effects are particularly noticeable when the pH is lowered to about pH 7.0 to 8.0. If it is not desired to add sufficient of the oil fatty acids to obtain these lowered pH values, additional buffering agents, such as boric acid, mono-sodium phosphate, etc., may be added to give a pH of about 7.0 to 8.0.

A paint having the following composition was prepared and is illustrative of the invention:

Example

| | | |
|---|---|---|
| Soya bean protein | pounds | 80 |
| Water | gallons | 50 |
| Borax | pounds | 8 |
| Soya oil fatty acids | do | 8 |
| Titanium pigment | do | 448 |
| Asbestine | do | 250 |
| Calcite | do | 128 |
| Sodium ortho phenyl phenate | do | 4 |
| Pine oil | gallons | 1.5 |

The soya bean protein was an isolated soya bean prepared by alkaline extraction and denatured according to U. S. Patent 1,955,375. The protein was first mixed with water and dissolved by means of the borax. The pine oil is preferably added to the borax cut to retard foaming. The pigments are then added. The sodium ortho phenyl phenate is a preservative and may be added at any suitable time. The pH of the composition was 7.9.

In place of borax, other alkaline cutting agents such as sodium hydroxide, sodium carbonate, etc., may be used. Various pigments and pigment combinations with or without coloring dye substances may be employed. Instead of immediately incorporating the pigments, the alkaline solution may be kept or shipped as a base for various paints, coating compositions, etc. The present invention may be employed in the preparation of compositions for various uses, such as paints, coating compositions, in the manufacture of wall paper, etc.

In the example given, an isolated soya bean protein was used, but it is to be understood that other soya bean protein may be used. The protein may be an isolated protein prepared in other chemical processes or may be a soya bean flour or meal. The amount of oil fatty acids will ordinarily vary between 5 to 40%, based on the protein, depending on the particular plasticity desired, the kind of pigment used and the degree of pigmentation, more pigment requiring more of the plasticizer. Any of the oil fatty acids may be used, but soya oil fatty acids give noticeably better plasticizing action.

The invention may also be applied to the plastic and other protein compositions as well as to paints, the plasticizing action of the oil acids being present in all such compositions.

Having described my invention what is claimed and desired to secure by Letters Patent of the United States is:

1. The method of plasticizing soya bean protein which comprises dissolving the protein in an alkaline solution at a relatively high pH value, incorporating oil fatty acids therewith in amounts sufficient to plasticize the protein, and adjusting the pH to about 7 to 8, the initial pH value and the amounts of material being such that the final viscosity is lower than it would have been if the protein had been initially dissolved at the final pH value.

2. The method of preparing a soya bean protein composition which comprises dissolving the protein in an alkaline solution at a relatively high pH value, and then lowering the pH value to about pH 7 to 8, by means of oil fatty acids, the initial pH value and the amounts of material being such that the final viscosity is lower than it would have been if the protein had been initially dissolved at the final pH value.

3. The method of preparing a soya bean protein composition which comprises dissolving the protein in an alkaline solution at a relatively high pH value, and then lowering the pH value to about 7 to 8 by means of acid material comprising oil fatty acids, the initial pH value and the amounts of material being such that the final viscosity is lower than it would have been if the protein had been initially dissolved at the final pH value, the amount of fatty acid being sufficient to plasticize the protein.

4. A plasticized protein composition of matter comprising an alkaline dispersion of soya bean protein which was initially dissolved at a relatively high pH value and to which has been added sufficient oil fatty acids to plasticize the protein, said composition having a pH value of about 7 to 8, the initial pH value and the amounts of material being such that the final viscosity is lower than it would have been if the protein had been initially dissolved at the final pH value.

5. A plasticized protein composition comprising an alkaline dispersion of soya bean protein which was initially dissolved at a relatively high pH value and to which has been added sufficient soya oil fatty acids to plasticize the protein, said composition having a pH of about 7 to 8, the initial pH value and the amounts of material being such that the final viscosity is lower than it would have been if the protein had been initially dissolved at the final pH value.

6. The method of plasticizing soya bean protein which comprises preparing an alkaline solution of the protein having a relatively high pH value and incorporating oil fatty acids therewith in amount sufficient to plasticize the protein and to lower the pH value of the solution without materially increasing the viscosity of the solution, the initial pH value and the amounts of material being such that the final viscosity is lower than it would have been if the protein had been initially dissolved at the final pH value.

7. The method of claim 6 in which the oil fatty acids are soybean oil fatty acids.

8. The method of claim 6 in which the amount of fatty acids is from 5 to 40% by weight of the protein.

9. A coating composition comprising a plasticized protein composition comprising an alkaline solution of soya bean protein which was initially dissolved at a relatively high pH value and to which has been added sufficient oil fatty acids to plasticize the protein, said solution having a pH value of about 7 to 8, the initial pH value and the amounts of material being such that the final viscosity is lower than it would have been if the protein had been initially dissolved at the final pH value and pigment.

10. The composition of claim 9 in which the oil fatty acids are soybean oil fatty acids.

ALBERT J. HEBERER.